(12) United States Patent
Sato

(10) Patent No.: US 9,001,034 B2
(45) Date of Patent: Apr. 7, 2015

(54) INFORMATION PROCESSING APPARATUS, PROGRAM, AND INFORMATION PROCESSING METHOD

(71) Applicant: Sony Corporation, Tokyo (JP)

(72) Inventor: Kazuhiro Sato, Tokyo (JP)

(73) Assignee: Sony Corporation (JP)

( * ) Notice: Subject to any disclaimer, the term of this patent is extended or adjusted under 35 U.S.C. 154(b) by 39 days.

(21) Appl. No.: 13/849,765

(22) Filed: Mar. 25, 2013

(65) Prior Publication Data

US 2013/0265219 A1   Oct. 10, 2013

(30) Foreign Application Priority Data

Apr. 5, 2012   (JP) ................ P2012-086195

(51) Int. Cl.
| | |
|---|---|
| G09G 5/00 | (2006.01) |
| G06F 3/01 | (2006.01) |
| G06F 1/16 | (2006.01) |
| G06F 3/042 | (2006.01) |
| H04N 5/232 | (2006.01) |
| G03B 13/30 | (2006.01) |

(52) U.S. Cl.
CPC ................ *G06F 3/01* (2013.01); *G06F 1/1673* (2013.01); *G06F 3/0426* (2013.01); *H04N 5/23212* (2013.01); *G03B 13/30* (2013.01)

(58) Field of Classification Search
CPC ....... G06F 1/1673; G06F 3/01; G06F 3/0426; G06F 3/0488; G06F 3/04886; G03B 13/30; H04N 5/23212

USPC .................. 345/156, 168, 173, 175; 715/773
See application file for complete search history.

(56) References Cited

U.S. PATENT DOCUMENTS

| | | | |
|---|---|---|---|
| 6,621,524 B1 * | 9/2003 | Iijima et al. ............... | 348/584 |
| 2002/0150308 A1 * | 10/2002 | Nakamura ................ | 382/286 |
| 2008/0218612 A1 * | 9/2008 | Border et al. ............ | 348/262 |
| 2008/0225234 A1 * | 9/2008 | Bauer et al. .............. | 352/140 |
| 2009/0086053 A1 * | 4/2009 | Ahn ...................... | 348/222.1 |
| 2010/0053415 A1 * | 3/2010 | Yun ........................ | 348/345 |
| 2010/0110178 A1 * | 5/2010 | Isobe et al. .............. | 348/135 |
| 2010/0110182 A1 * | 5/2010 | Kanayama .............. | 348/140 |
| 2010/0118142 A1 * | 5/2010 | Ohsawa .................. | 348/140 |
| 2010/0165174 A1 * | 7/2010 | Liaw et al. ............... | 348/345 |
| 2010/0171815 A1 * | 7/2010 | Park et al. ................ | 348/47 |
| 2010/0194971 A1 * | 8/2010 | Li et al. ................... | 348/349 |
| 2011/0249173 A1 * | 10/2011 | Li et al. ................... | 348/349 |
| 2012/0013645 A1 * | 1/2012 | Hu .......................... | 345/667 |
| 2012/0182448 A1 * | 7/2012 | Cohen et al. ............ | 348/231.99 |
| 2012/0200673 A1 * | 8/2012 | Tagawa et al. .......... | 348/46 |
| 2012/0300114 A1 * | 11/2012 | Isogai et al. ............. | 348/345 |
| 2013/0135199 A1 * | 5/2013 | Perski et al. ............. | 345/156 |
| 2013/0314586 A1 * | 11/2013 | Shimamoto et al. ..... | 348/348 |

FOREIGN PATENT DOCUMENTS

JP   2008123316 A   5/2008

\* cited by examiner

*Primary Examiner* — Tom Sheng
(74) *Attorney, Agent, or Firm* — Lerner, David, Littenberg, Krumholz & Mentlik, LLP

(57) ABSTRACT

According to an illustrative embodiment, an information processing apparatus includes an imaging unit; and an image generation unit to generate a display image based on a distance between the imaging unit and an object, wherein the distance is detected by using a plurality of images obtained by the imaging unit at respective focus distances.

20 Claims, 18 Drawing Sheets

M

M

M

B

B

INFORMATION PROCESSING APPARATUS, PROGRAM, AND INFORMATION PROCESSING METHOD

CROSS-REFERENCE TO RELATED APPLICATION

The present application claims priority from Japanese Patent Application P2012-086195, filed in the Japanese Patent Office on Apr. 5, 2012, the entire content of which is hereby incorporated by reference herein.

BACKGROUND

The present disclosure relates to an information processing apparatus that projects an image or displays an image on a display, a program, and an information processing method.

In recent years, an input apparatus that projects an image of an input apparatus such as a keyboard on a plane of projection and receives, as an operation input, an operation of a user on the plane of projection is being developed. The input apparatus is configured to be able to determine an operation of a user, e.g., a motion of a hand by taking an image of a plane of projection with a camera.

For example, Japanese Patent Application Laid-open No. 2008-123316 discloses a data input method and data input apparatus, which take an image of a plane of projection of a keyboard image by using a plurality of imaging means, analyze the imaging data, specify a position of a user's finger that is in contact with the plane of projection, and receive a motion of the finger as an operation input. By taking an image of a plane of projection with a plurality of imaging means, it is considered possible to reduce an area under the shadow of a user's hand in a keyboard image.

SUMMARY

Since the data input apparatus disclosed in Japanese Patent Application Laid-open No. 2008-123316 needs a plurality of imaging means, as described above, dedicated hardware is considered to be necessary. In recent years, many devices with imaging means, such as a laptop computer and a cellular phone, are widely used. However, the disclosure described in Japanese Patent Application Laid-open No. 2008-123316 is difficult to be applied to the devices, because almost all of the devices are provided with only one camera in one direction.

In view of the circumstances as described above, it is desirable to provide an information processing apparatus capable of generating an image that has reflected the configuration of an object within an imaging range based on a taken image, a program, and an information processing method.

According to an illustrative embodiment, an information processing apparatus includes an imaging unit; and an image generation unit to generate a display image based on a distance between the imaging unit and an object, wherein the distance is detected by using a plurality of images obtained by the imaging unit at respective focus distances.

These and other objects, features and advantages of the present disclosure will become more apparent in light of the following detailed description of best mode embodiments thereof, as illustrated in the accompanying drawings.

DETAILED DESCRIPTION OF EMBODIMENTS

First Embodiment

Figure 1:
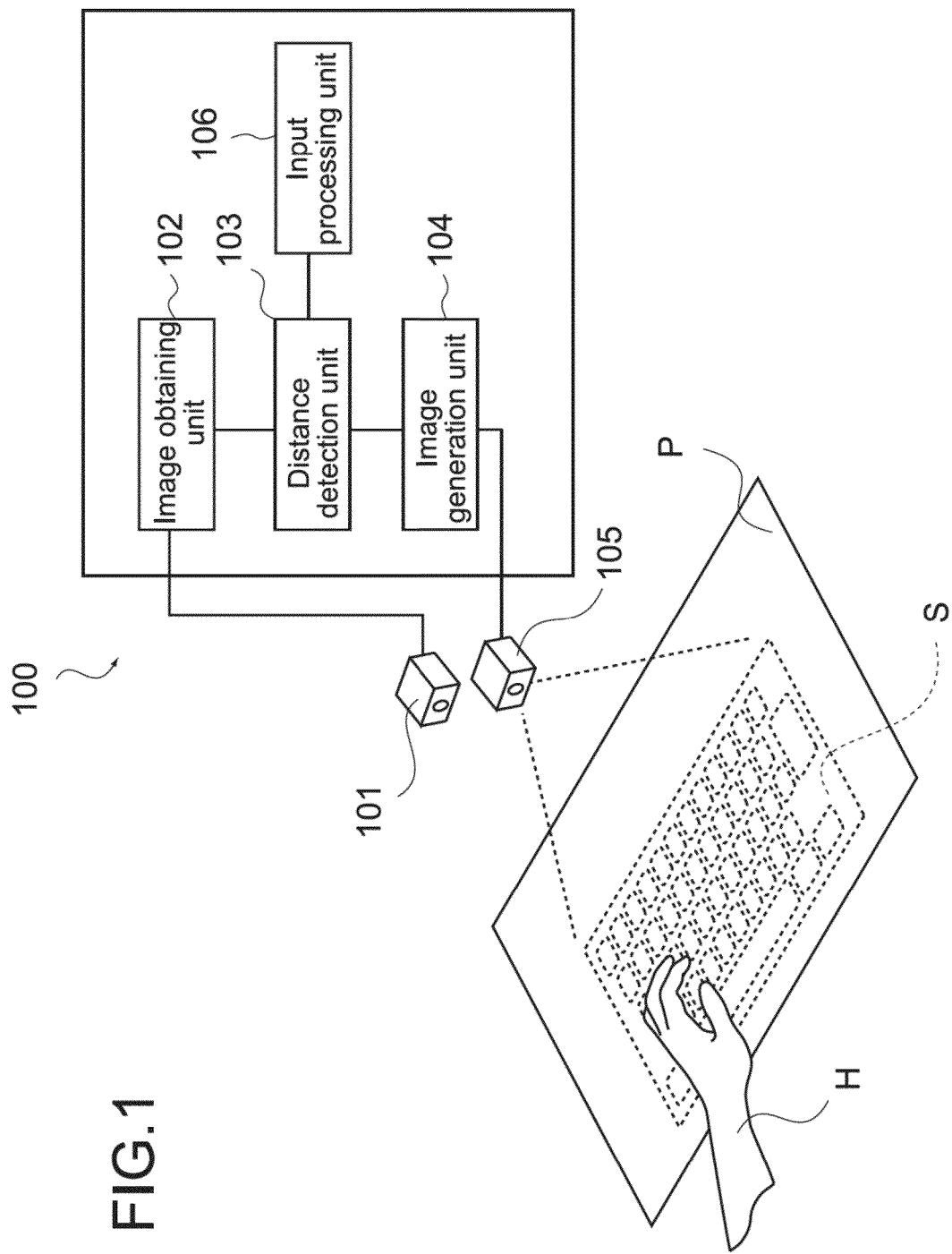
FIG. 1 is a schematic diagram showing a configuration of an information processing apparatus according to a first embodiment of the present disclosure.

An information processing apparatus according to a first embodiment of the present disclosure will be described.
[Configuration of Information Processing Apparatus]
FIG. 1 is a schematic diagram showing a configuration of an information processing apparatus 100 according to the first embodiment of the present disclosure. As shown in the figure, the information processing apparatus 100 includes an imaging unit 101, an image obtaining unit 102, a distance detection unit 103, an image generation unit 104, an image display unit 105, and an input processing unit 106. The imaging unit 101 is connected with the image obtaining unit 102, and the image obtaining unit 102 is connected with the distance detection unit 103. The distance detection unit 103 is connected with the image generation unit 104, and the image generation unit 104 is connected with the image display unit 105. The input processing unit 106 is connected with the distance detection unit 103. The information processing apparatus 100 can be any apparatus that is capable of generating and displaying an image, e.g., a cellular phone, a portable information terminal, and various computers such as a personal computer.

In FIG. 1, an image (hereinafter referred to as display image) S of an object to be displayed (e.g., keyboard) is projected on a plane of projection P (e.g., desk) by the image display unit 105. A user performs an input operation (e.g., typing) on the plane of projection P with reference to the display image S. A hand of the user is represented as hand H.

The imaging unit 101 includes an image sensor such as a CCD (Charge Coupled Device) and a CMOS (Complementary Metal Oxide Semiconductor) and a necessary optical system, and takes an image in an imaging range. The imaging unit 101 can change a focus distance (distance between the imaging unit 101 and the focal point), and changes the focus distance (focus) under control of the image obtaining unit 102. The imaging unit 101 outputs a taken image (hereinafter referred to as image) to the image obtaining unit 102.

The image obtaining unit 102 obtains an image taken by the imaging unit 101 and supplies the image to the distance detection unit 103. The image obtaining unit 102 controls the imaging unit 101, thereby causing the imaging unit 101 to change the focus distance and take an image. Although the details will be described later, the image obtaining unit 102 causes the imaging unit 101 to take an image at a plurality of focus distances.

The distance detection unit 103 performs predetermined image processing for a plurality of images supplied from the image obtaining unit 102, and detects a distance (hereinafter referred to as object distance) between the imaging unit 101 and an object (here, the user's hand H) within an imaging range of the imaging unit 101. The distance detection unit 103 supplies the object distance to the input processing unit 106 and the image generation unit 104.

The image generation unit 104 performs predetermined image processing for a plurality of images supplied from the image obtaining unit 102, and generates, based on the processing result, the display image S that is displayed by the image display unit 105. Although the details will be described later, the image generation unit 104 generates, based on the object distance, an image mask, and generates the display image S by using the image mask.

The image display unit 105 is a unit (projector) that can project an image, and projects the display image S that is generated by the image generation unit 104 on the plane of projection P. The image display unit 105 may be a projector that uses an arbitrary system. It is desirable that the image display unit 105 is disposed close to the imaging unit 101.

The input processing unit 106 determines a user's operation input based on the object distance supplied from the distance detection unit 103, and performs input processing for the operation input. Although the details will be described later, the input processing unit 106 detects a contact of the user's hand H on the plane of projection p, and determines the user's operation input based on the positional relationship between the contact position and the display image S. The input processing generated by the input processing unit 106 is supplied to an operating system of the information processing apparatus 100.

The information processing apparatus 100 has the configuration described above. The image obtaining unit 102, the distance detection unit 103, the image generation unit 104, and the input processing unit 106 can be functional parts implemented by the cooperation between software and hardware, are not limited to be housed physically in the casing of the information processing apparatus 100, and may also be mounted on a network.

[Operation of Information Processing Apparatus]

Figure 2:
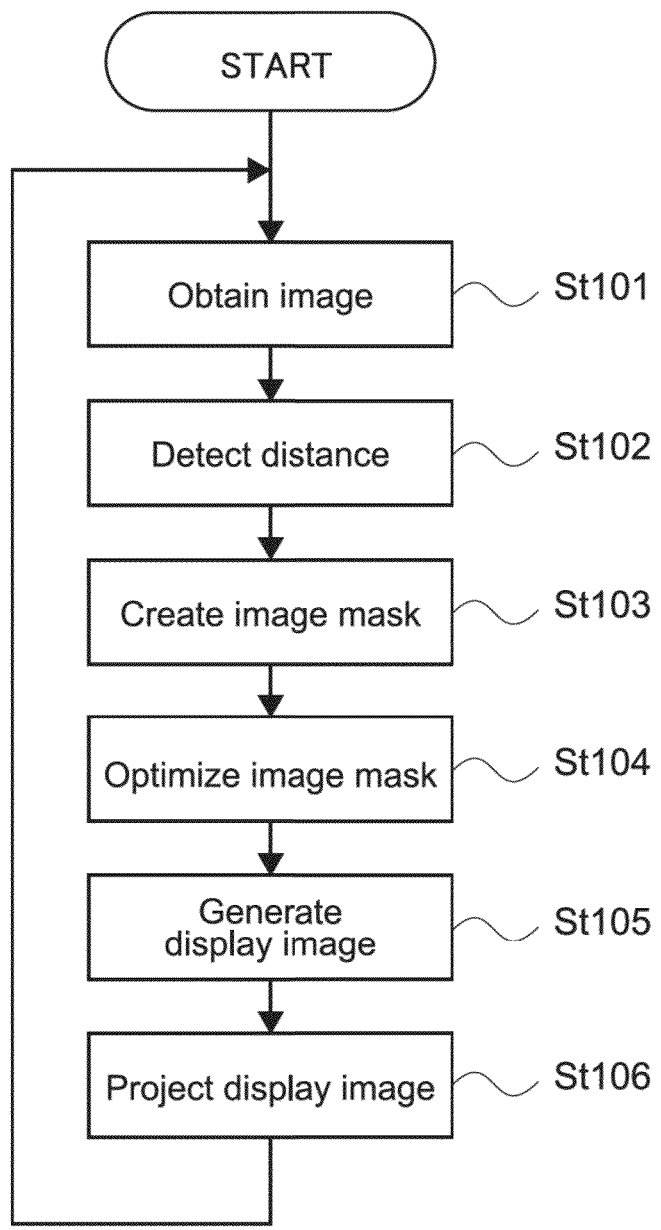
FIG. 2 is a flowchart showing an operation of the information processing apparatus.

FIG. 2 is a flowchart showing an operation of the information processing apparatus 100.

Figure 3:
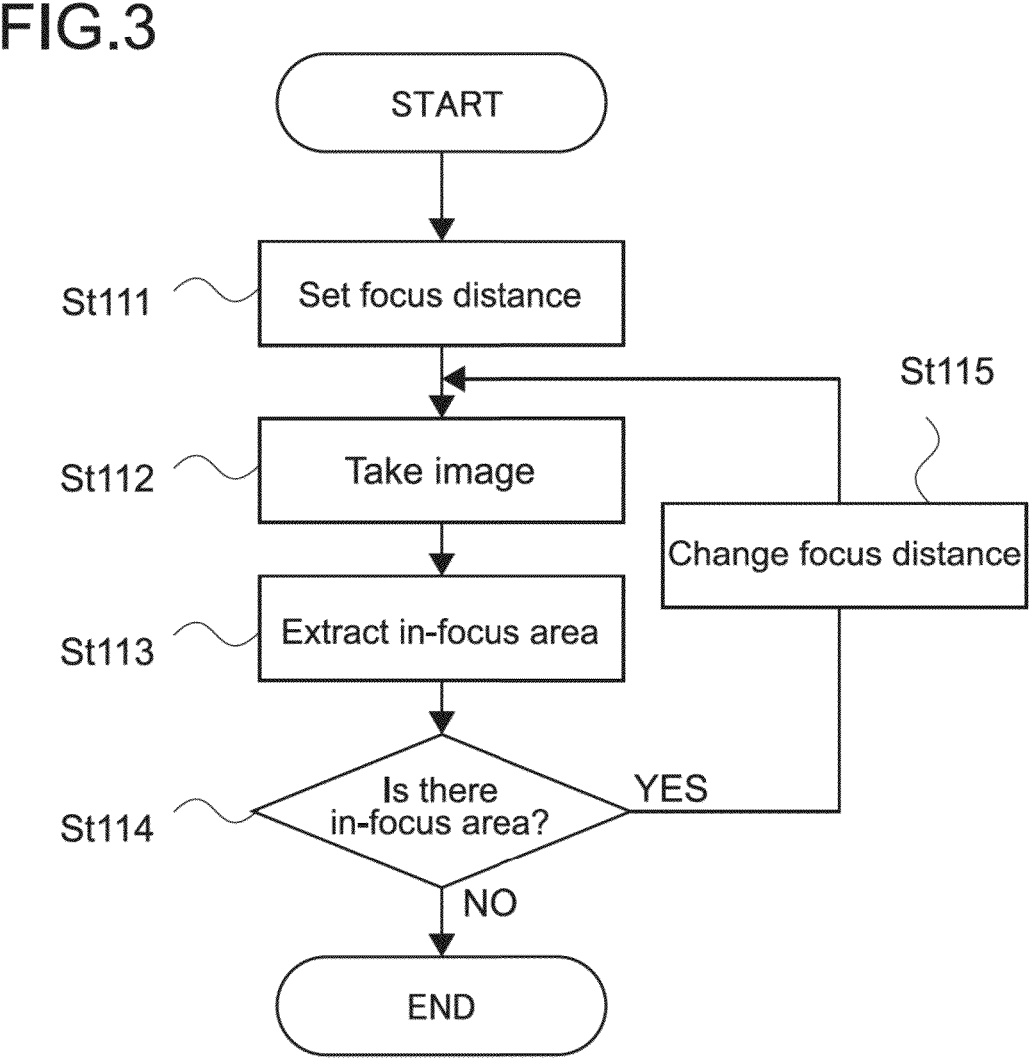
FIG. 3 is a flowchart showing how to obtain an image by an image obtaining unit in the information processing apparatus.
Figure 4:
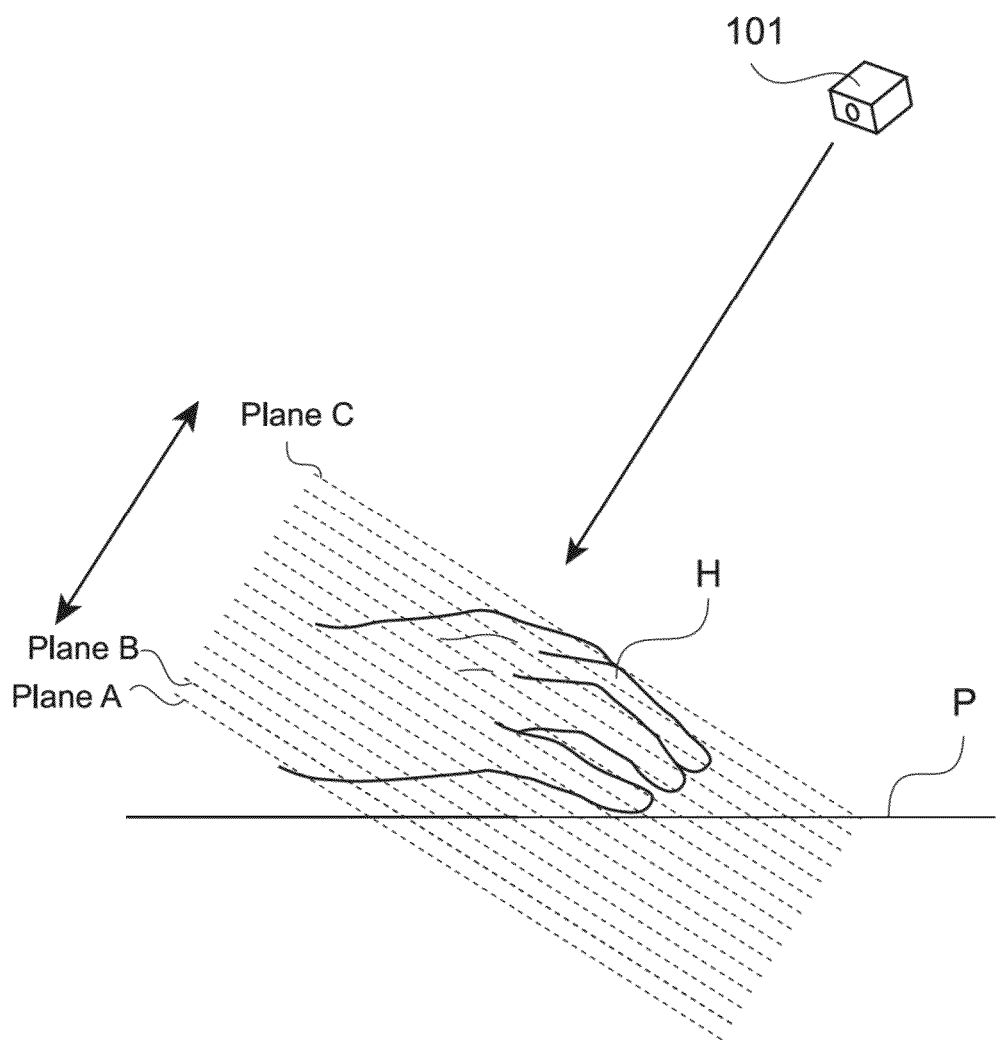
FIG. 4 is a schematic diagram showing a state of obtaining an image of the information processing apparatus.

As shown in FIG. 2, the image obtaining unit 102 obtains an image (St101). FIG. 3 is a flowchart showing how to obtain an image by the image obtaining unit 102, and FIG. 4 is a schematic diagram showing a state of obtaining an image.

As shown in FIG. 3, the image obtaining unit 102 controls the imaging unit 101 to set the focus distance to an initial value (St111). The initial value is a distance in which the plane of projection P is expected to be sufficiently included from the imaging unit 101, and can be set depending on, for example, the position of the imaging unit 101 in the information processing apparatus 100. FIG. 4 shows, as a plane A, a plane including a focus distance that has the initial value.

The image obtaining unit 102 causes the imaging unit 101 to take an image at the focus distance (plane A) (St112). The image obtaining unit 102 extracts an in-focus area from the image taken on the plane A (St113). The in-focus area is an area in focus in an image, and can be detected based on, for example, a contrast or phase difference of each pixel in the image.

Next, the image obtaining unit 102 confirms whether or not an in-focus area has been detected in an image (St114). In the case where an in-focus area has been detected (Yes in St114), the image obtaining unit 102 moves the focus distance (St115). Specifically, the image obtaining unit 102 changes the focus distance from the initial value (plane A) to a distance closer to the imaging unit 101 (plane B). The interval between the plane A and the plane B is arbitrary, and can be, for example, several mm if the depth of field is shallow.

The image obtaining unit 102 repeats a process of changing a focus distance, a process of taking an image, and subsequent processes, as long as an in-focus area is detected. In the case where an in-focus area has not been detected (No in St114), the image obtaining unit 102 ends the process of obtaining an image. For example, an image is taken between the plane A and a plane C at a predetermined interval in the case of FIG. 4, because a focus distance at which an in-focus area is detected last (hand H exists) is on the plane C. It should be noted that although an in-focus area is detected also in front of the plane of projection P when an image is taken between the plane A and the plane C at a predetermined interval, the in-focus area can be deleted because an in-focus area on the plane of projection P is almost straight and can be in-focus area data that is obviously different from a solid object such as a hand, if the plane of projection P has a flat surface such as a desk or a curved surface with fewer concavity and convexity than a hand.

As described above, the image obtaining unit 102 obtains a plurality of images taken at a predetermined interval in a range that includes at least the user's hand H. Moreover, the image obtaining unit 102 stores data on an in-focus area, which is used for the detection of the object (hand H).

Next, turning back to FIG. 2, the distance detection unit 103 detects the distance (object distance) between the imaging unit 101 and the object (hand H) within an imaging range of the imaging unit 101 (St102). Specifically, the distance detection unit 103 can detect, by specifying the position of the hand H for each image based on a distribution of an in-focus area in the image, the configuration of the object (distance between respective parts of the hand H and the imaging unit 101). The distance detection unit 103 supplies the object distance to the image generation unit 104.

Figure 5:
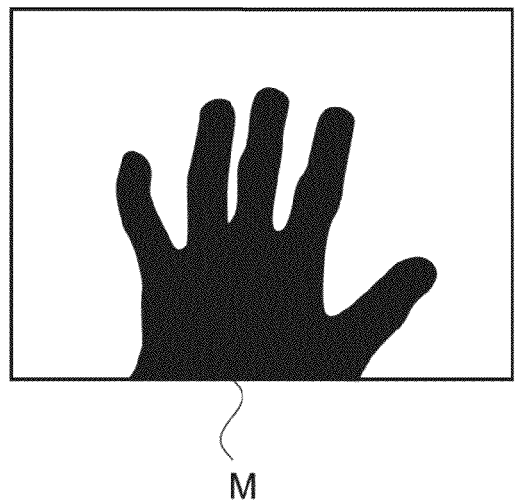
FIG. 5 is a schematic diagram showing an image mask created by an image generation unit in the information processing apparatus.

Next, the image generation unit 104 creates an image mask (St103). The image generation unit 104 calculates the shape of the hand H projected on a plane closer to the imaging unit 101 than the plane of projection P (e.g., plane C) by using the object distance detected by the distance detection unit 103 to create an image mask. FIG. 5 shows an example of an image mask M created by the image generation unit 104.

Figure 6:
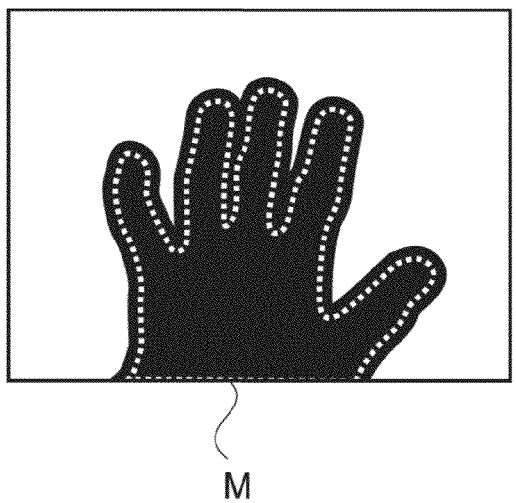
FIG. 6 is a schematic diagram showing an optimization of the image mask by the image generation unit in the information processing apparatus.
Figure 7:
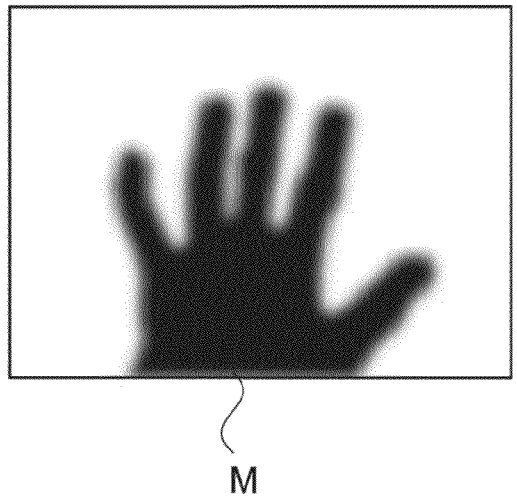
FIG. 7 is another schematic diagram showing an optimization of the image mask by the image generation unit in the information processing apparatus.

Next, the image generation unit 104 optimizes the image mask M as necessary (St104). FIGS. 6 and 7 are each a schematic diagram showing an optimization of the image mask M by the image generation unit 104. As shown in FIG. 6, for example, the image generation unit 104 magnifies the image mask M at a predetermined proportion (e.g., about 5 to 10%). Alternatively, the image mask M is contracted at a predetermined proportion (e.g., about −5 to −10%) if a shadow on the plane of projection P is annoying, i.e., a mask optimal value can be incremented and decremented sequentially. Moreover, as shown in FIG. 7, the image generation unit 104 can blur the boundaries of the image mask M. With such an optimization of the image mask M, it is possible to reduce extra projection in related art, which is projected on a side surface of a finger or the like, and improve the visibility of the display image S to be described later. Since the boundaries are blurred, there is no need to update mask data at a first rate in an actual time in response to a fine motion of a finger. Therefore, information processing can be reduced, and it is expected to be able to increase operating time of an apparatus that uses a battery.

Figure 8:
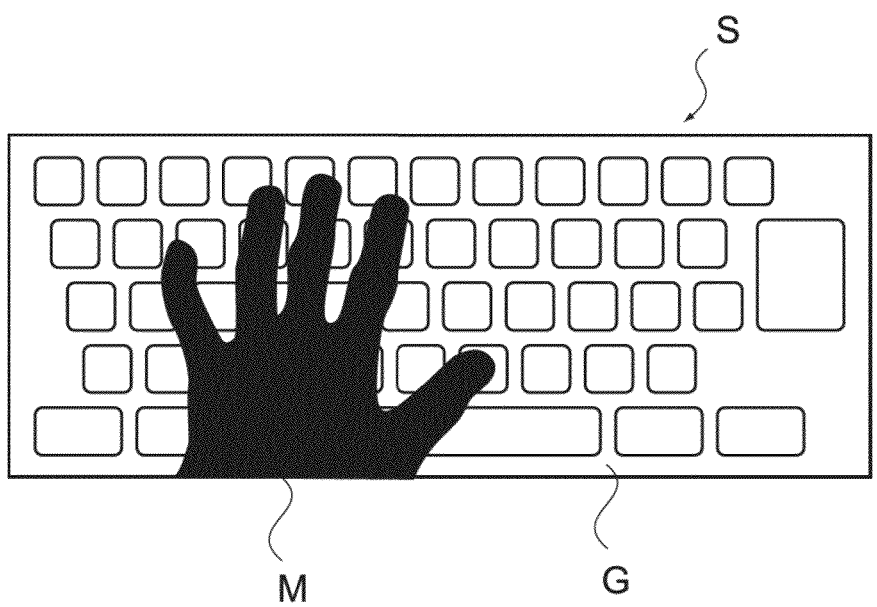
FIG. 8 is a schematic diagram showing how to generate a display image by the image generation unit in the information processing apparatus.

Next, the image generation unit 104 generates the display image S by using the image mask M (St105). FIG. 8 is a schematic diagram showing how to generate the display image S by the image generation unit 104. As shown in the figure, the image generation unit 104 combines the image mask M with an image (hereinafter referred to as display object image) G of an object to be displayed (here, keyboard) to generate the display image S.

Figure 9:
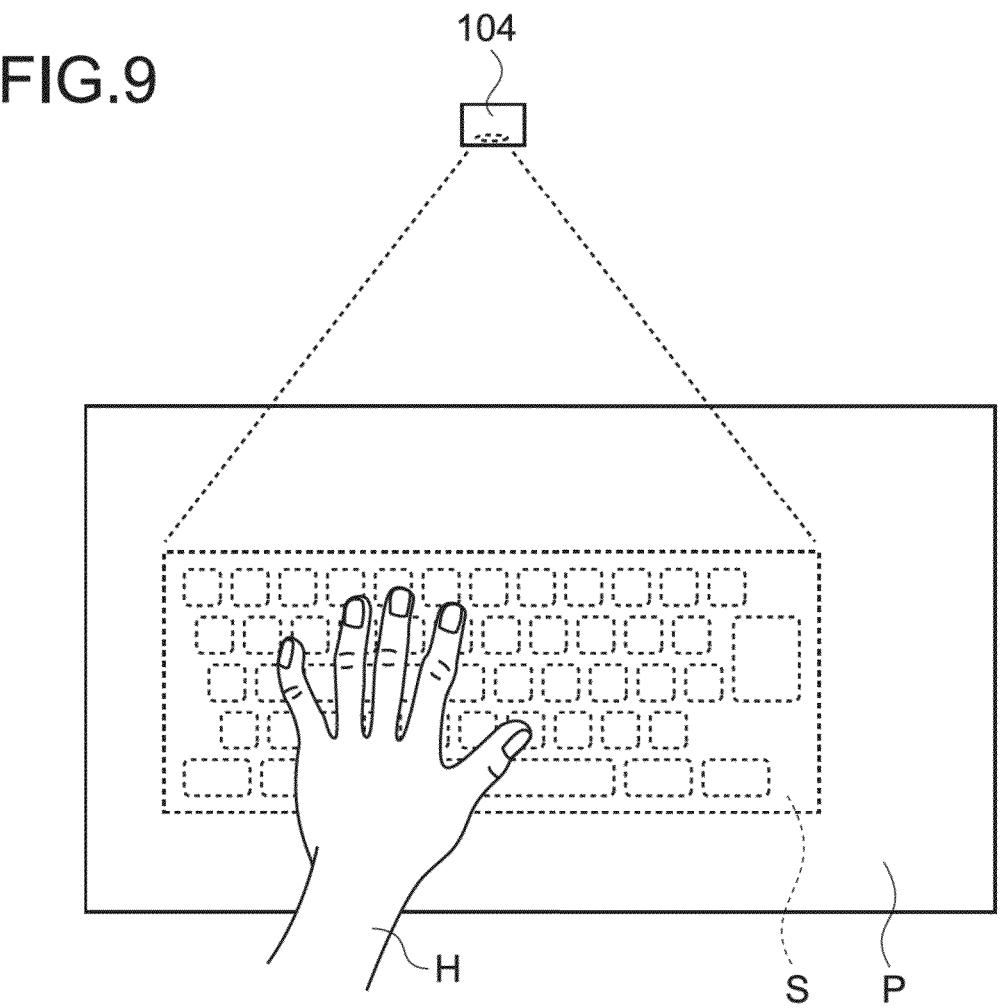
FIG. 9 is a schematic diagram showing a display image projected by an image display unit in the information processing apparatus.

Next, the image generation unit 104 supplies the generated display image S to the image display unit 105 and causes the image display unit 105 to project the display image S (St106). FIG. 9 is a diagram showing the display image S projected by the image display unit 105. As shown in the figure, the display object image G is not projected on the user's hand H, because the display object image G is not displayed on the image mask M. Therefore, it is possible to prevent the visibility from being deteriorated. At this time, the image generation unit 104 may perform power control to cut power that is necessary for displaying the area corresponding to the image mask M.

It should be noted that the input processing unit 106 performs input processing for the user's operation input along with the generation and projection of the display image S. The input processing unit 106 can determine whether or not the hand H is in contact with the plane of projection P based on the distance (object distance) between the hand H and the imaging unit 101, which is supplied from the distance detection unit 103. The input processing unit 106 determines the user's operation input based on, for example, the positional relationship between the display image S and the place at which the hand H is in contact with the plane of projection P.

As described above, in this embodiment, it is possible to detect a distance between the imaging unit 101 and the object (hand H) within the imaging range based on a plurality of images taken at a different focus distance. Further, it is possible to generate an image mask by using the distance. Accordingly, the display object image G is prevented from being projected on the hand H, thereby preventing the user's visibility from being deteriorated.

Second Embodiment

An information processing apparatus according to a second embodiment of the present disclosure will be described.

[Configuration of Information Processing Apparatus]

Figure 10:
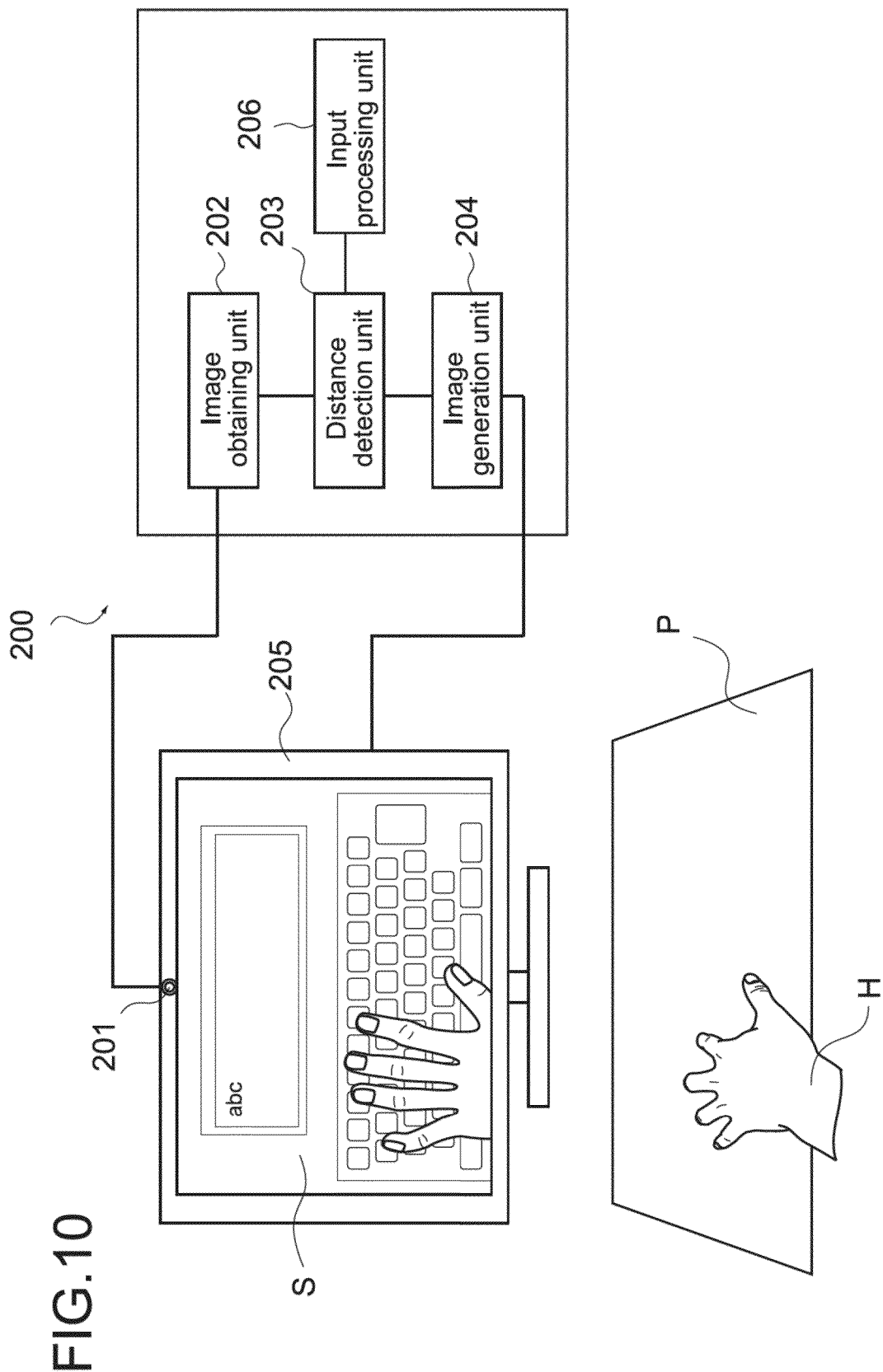
FIG. 10 is a schematic diagram showing a configuration of an information processing apparatus according to a second embodiment of the present disclosure.

FIG. 10 is a schematic diagram showing a configuration of an information processing apparatus 200 according to the second embodiment. As shown in the figure, the information processing apparatus 200 includes an imaging unit 201, an image obtaining unit 202, a distance detection unit 203, an image generation unit 204, an image display unit 205, and an input processing unit 206. The imaging unit 201 is connected with the image obtaining unit 202, and the image obtaining unit 202 is connected with the distance detection unit 203. The distance detection unit 203 is connected with the image generation unit 204, and the image generation unit 204 is connected with the image display unit 205. The input processing unit 206 is connected with the distance detection unit 203. The information processing apparatus 200 can be any apparatus that is capable of generating and displaying an image, e.g., a cellular phone, a portable information terminal, and various computers such as a personal computer.

In FIG. 10, a user performs an input operation (e.g., typing) on an operational plane P (e.g., regular desk) that displays nothing. A hand of the user is represented as hand H. An image of the operational plane P including the hand H is taken by the imaging unit 201, and an image obtained by combining an image of the hand H and an image of an object to be displayed (e.g., keyboard) is displayed on the image display unit 205 as the display image S.

The imaging unit 201 includes an image sensor such as a CCD (Charge Coupled Device) and a CMOS (Complementary Metal Oxide Semiconductor) and a necessary optical system, and takes an image in an imaging range. The imaging unit 201 can change a focus distance (distance between the imaging unit 201 and the focal point), and changes the focus distance (focus) under control of the image obtaining unit 202. The imaging unit 201 outputs a taken image (hereinafter referred to as image) to the image obtaining unit 202. The imaging unit 201 is desirably mounted to the image display unit 205 (e.g., display).

The image obtaining unit 202 obtains an image taken by the imaging unit 201 and supplies the image to the distance detection unit 203. The image obtaining unit 202 controls the imaging unit 201, thereby causing the imaging unit 201 to change the focus distance and take an image. Although the details will be described later, the image obtaining unit 202 causes the imaging unit 201 to take an image at a plurality of focus distances.

The distance detection unit 203 performs predetermined image processing for a plurality of images supplied from the image obtaining unit 202, and detects a distance (hereinafter referred to as object distance) between the imaging unit 201 and an object (here, the user's hand H) within an imaging range of the imaging unit 201. The distance detection unit 203 supplies the object distance to the input processing unit 206 and the image generation unit 204.

The image generation unit 204 performs predetermined image processing for a plurality of images supplied from the image obtaining unit 202, and generates, based on the processing result, the display image S that is displayed by the image display unit 205. Although the details will be described later, the image generation unit 204 extracts, based on the object distance, an image of the hand H from the image, and generates the display image S by using the image of the hand H.

The image display unit 205 is a unit (display) that can display an image, and displays the display image S that is generated by the image generation unit 204 on a display screen. The image display unit 205 may be a display that uses an arbitrary system. As described above, to the image display unit 205, the imaging unit 201 is mounted.

The input processing unit 206 determines a user's operation input based on the object distance supplied from the distance detection unit 203, and performs input processing for the operation input. Although the details will be described later, the input processing unit 206 detects a contact of the user's hand H on the operational plane p, and determines the user's operation input based on the positional relationship between the contact position and the imaging unit 201. The input processing generated by the input processing unit 206 is supplied to an operating system of the information processing apparatus 200.

The information processing apparatus 200 has the configuration described above. The image obtaining unit 202, the distance detection unit 203, the image generation unit 204, and the input processing unit 206 can be functional parts implemented by the cooperation between software and hardware, are not limited to be housed physically in the casing of the information processing apparatus 200, and may also be mounted on a network.

[Operation of Information Processing Apparatus]

Figure 11:
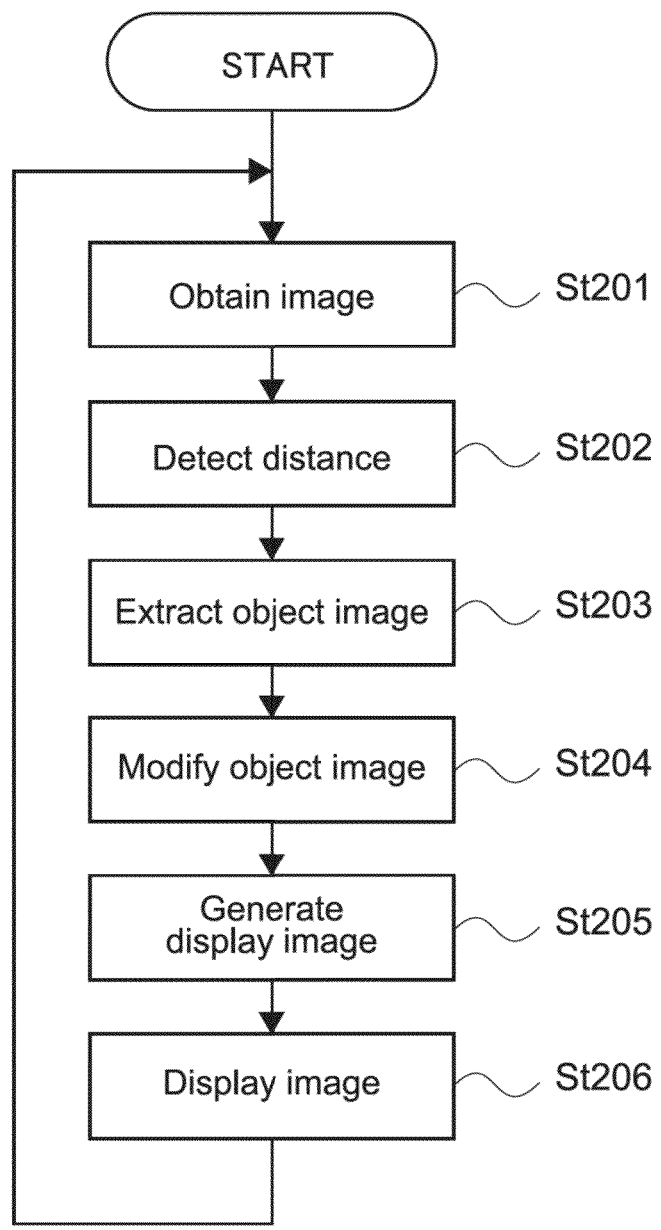
FIG. 11 is a flowchart showing an operation of the information processing apparatus.

FIG. 11 is a flowchart showing an operation of the information processing apparatus 200.

As shown in FIG. 11, the image obtaining unit 202 obtains an image (St201). The image obtaining unit 202 can obtain an image in the same manner as the first embodiment. Specifically, the image obtaining unit 202 obtains a plurality of images taken at a predetermined interval in a range that includes at least the user's hand H while moving a focus distance of the imaging unit 201. Moreover, the image obtaining unit 202 stores data on an in-focus area, which is used for the detection of the object (hand H).

Next, the distance detection unit 203 detects the distance (object distance) between the imaging unit 201 and the object (hand H) within an imaging range of the imaging unit 201 (St202). Specifically, the distance detection unit 203 can detect, by specifying the position of the hand H for each image based on a distribution of an in-focus area in the image, the configuration of the object (distance between respective parts of the hand H and the imaging unit 201). The distance detection unit 203 supplies the object distance to the image generation unit 204.

Figure 12:
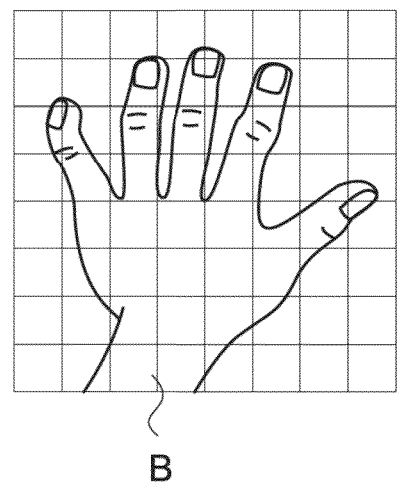
FIG. 12 is a flowchart showing an object image extracted by an image generation unit in the information processing apparatus.

Next, the image generation unit 204 extracts an object image (image of the hand H) by using the object distance (St203). Specifically, the image generation unit 204 selects one image, e.g., an (extensively focused) image that has the largest in-focus area, from a plurality of images obtained by the image obtaining unit 202. The image generation unit 204 can extract an image area (object image) corresponding to the hand H from the image by using the object distance. FIG. 12 is a schematic diagram showing an object image B that is extracted by the image generation unit 204.

Figure 13:
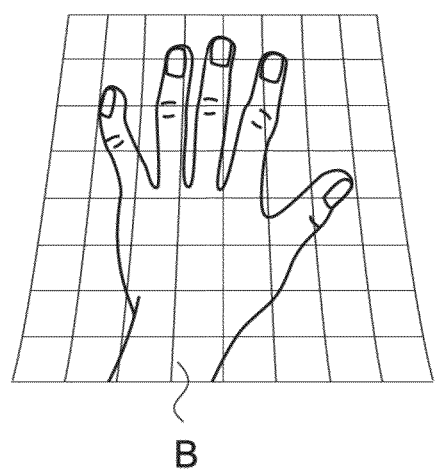
FIG. 13 is a schematic diagram showing an object image modified by the image generation unit in the information processing apparatus.

Next, the image generation unit 204 modifies the extracted object image B as necessary (St204). As shown in FIG. 12, in the object image B, a side of the hand H, which is close to the imaging unit 201, is magnified depending on the positional relationship between the imaging unit 201 and the hand H in some cases. FIG. 13 is a schematic diagram showing the modified object image B. The image generation unit 204 compresses an area in the object image B, which is close to the imaging unit 201, and extends an area in the object image B, which is distant from the imaging unit 201, as shown in FIG. 13. Thus, the image generation unit 204 can modify the object image B. Accordingly, it is possible to prevent the deformation of the object image B due to the difference between the viewpoint of the user and the viewpoint of the imaging unit 201.

Figure 14:
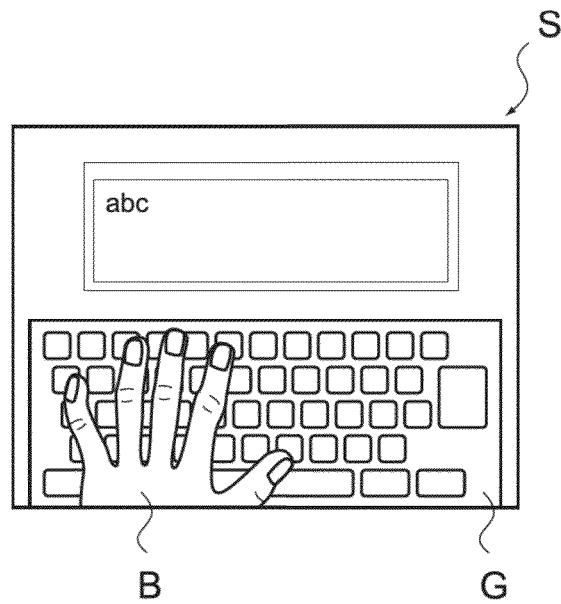
FIG. 14 is a schematic diagram showing a display image generated by the image generation unit in the information processing apparatus.

Next, the image generation unit 204 generates a display image (St205). FIG. 14 is a schematic diagram showing the display image S generated by the image generation unit 204. As shown in the figure, the image generation unit 204 superimposes the object image B on the image (hereinafter referred to as display object image) G of an object to be displayed (here, keyboard) to generate the display image S. At this time, the image generation unit 204 performs alignment of the object image B and the display object image G. For example, the image generation unit 204 can set an area in the object image B, which corresponds to a left pinky finger of the hand H, to the vicinity of the "Q" key in the keyboard, and an area in the object image B, which corresponds to a right pinky finger of the hand H, to the vicinity of the "Enter" key in the keyboard. If the alignment is performed frequently, a description of the display object image G blurs. Therefore, the alignment only has to be performed when the display image is generated first.

Figure 15:
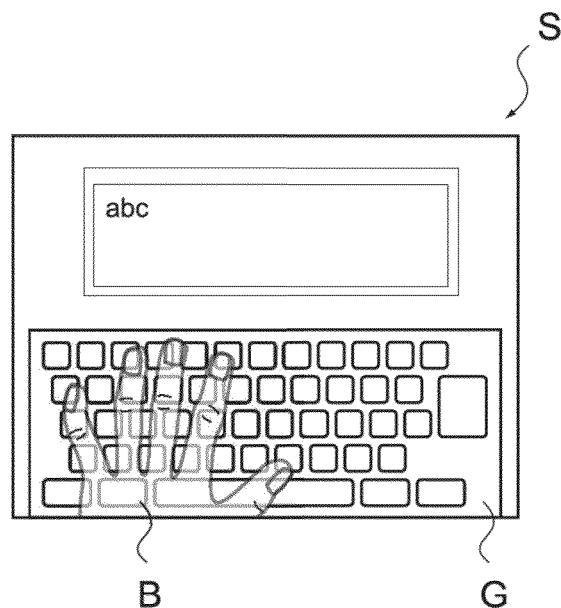
FIG. 15 is a schematic diagram showing a display image generated from an object image permeabilized by the image generation unit in the information processing apparatus.

The image generation unit 204 can permeabilize the object image B when generating the display image S. FIG. 15 is a schematic diagram showing the display image S generated from an object image permeabilized by the image generation unit 204. As shown in the figure, the object image B is permeabilized. Accordingly, the display object image G is displayed through the object image B, and the user can visually confirm the display object image G. Moreover, the image generation unit 204 can dye the object image B with a color instead of the permeabilization to clearly show the object image B (i.e., the hand H) for the user.

The image generation unit 204 outputs the generated display image S to the image display unit 205, and causes the image display unit 205 to display the display image S on a display screen thereof (St206). The user can perform an operation input on the operational plane P that displays nothing, with reference to the display object image G displayed on the image display unit 205.

It should be noted that the input processing unit 206 performs input processing for the user's operation input along with the generation and display of the display image S. The input processing unit 206 can determine whether or not the hand H is in contact with the operational plane P based on the distance (object distance) between respective parts of the hand H and the imaging unit 201, which is supplied from the distance detection unit 203. The input processing unit 206 determines the user's operation input based on, for example, the positional relationship between the imaging unit 201 and the place at which the hand H is in contact with the operational plane P.

As described above, in this embodiment, it is possible to detect a distance between the imaging unit 201 and the object (hand H) within the imaging range based on a plurality of images taken at a different focus distance. Further, it is possible to extract an image of the object by using the distance. Accordingly, a display image obtained by combining the object and the display object image is displayed. The user can perform input processing with reference to the display image.

Third Embodiment

An information processing apparatus according to a third embodiment of the present disclosure will be described.

[Configuration of Information Processing Apparatus]

Figure 16:
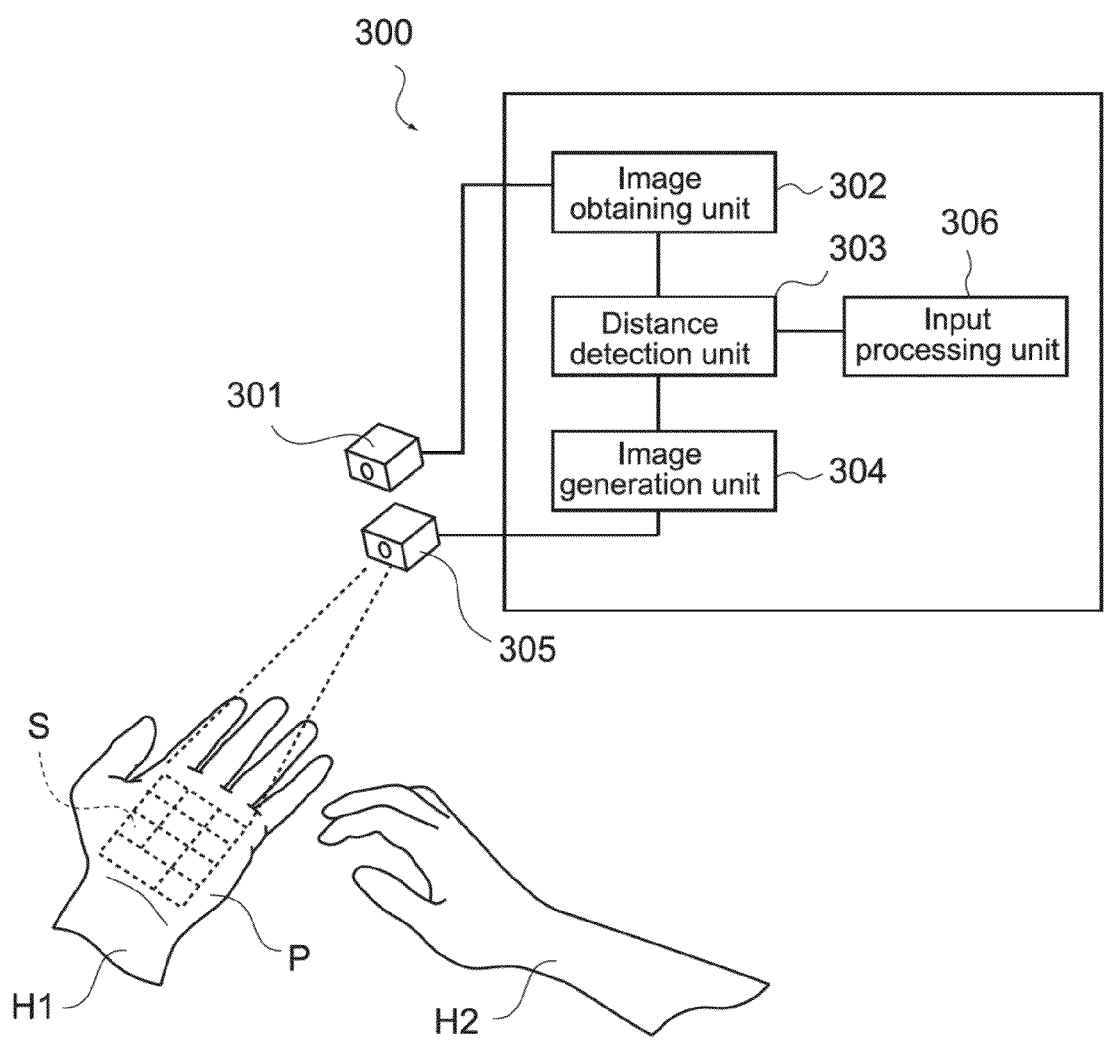
FIG. 16 is a schematic diagram showing a configuration of an information processing apparatus according to a third embodiment of the present disclosure.

FIG. 16 is a schematic diagram showing a configuration of an information processing apparatus 300 according to the third embodiment. As shown in the figure, the information processing apparatus 300 includes an imaging unit 301, an image obtaining unit 302, a distance detection unit 303, an image generation unit 304, an image display unit 305, and an input processing unit 306. The imaging unit 301 is connected with the image obtaining unit 302, and the image obtaining unit 302 is connected with the distance detection unit 303. The distance detection unit 303 is connected with the image generation unit 304, and the image generation unit 304 is connected with the image display unit 305. The input processing unit 306 is connected with the distance detection unit 303. The information processing apparatus 300 can be any apparatus that is capable of generating and projecting an image, e.g., a cellular phone, a portable information terminal, and various computers such as a personal computer.

In FIG. 16, an image (display image S) of an object to be displayed (e.g., keyboard) is projected on the plane of projection P that is a surface of a hand H1 of a user. The user performs an input operation (e.g., typing) on the plane of projection P with reference to the display image S. A hand of the user, which is used for the input operation, is represented as hand H2.

The imaging unit 301 includes an image sensor such as a CCD (Charge Coupled Device) and a CMOS (Complementary Metal Oxide Semiconductor) and a necessary optical system, and takes an image in an imaging range. The imaging unit 301 can change a focus distance (distance between the imaging unit 301 and the focal point), and changes the focus distance (focus) under control of the image obtaining unit 302. The imaging unit 301 outputs a taken image (hereinafter referred to as image) to the image obtaining unit 302.

It should be noted that the imaging unit 301 is not limited to the image sensor described above, and may use a dedicated method for measuring a distance image, such as a TOF (time-of-flight) method. In the TOF method, a distance to an object is measured based on the arrival time of light. Specifically, non-visible light such as an infrared ray is pulse-modulated to be irradiated within the angle of view, and an image sensor measures the pulse phase lag. Thus, the distance to an object is calculated (reference URL: http://www.nikkei.com/tech/news/article/g=96958A9C93819499E0E6E2E1E48 DE0E6E2E0E0E2E3E0E2E2E2E2E2E2;da=96958A88 889DE2E4E1E2E5E0E6E2E0E7E2E6E0E2E3 E2E2E2E2E2E2E2).

The image obtaining unit 302 obtains an image taken by the imaging unit 301 and supplies the image to the distance detection unit 303. The image obtaining unit 302 controls the imaging unit 301, thereby causing the imaging unit 301 to change the focus distance and take an image. Although the details will be described later, the image obtaining unit 302 causes the imaging unit 301 to take an image at a plurality of focus distances.

The distance detection unit 303 performs predetermined image processing for a plurality of images supplied from the image obtaining unit 302, and detects a distance (hereinafter referred to as object distance) between the imaging unit 301 and an object (here, the user's hand H1) within an imaging range of the imaging unit 301. The distance detection unit 303 supplies the object distance to the input processing unit 306 and the image generation unit 304.

The image generation unit 304 performs predetermined image processing for a plurality of images supplied from the image obtaining unit 302, and generates, based on the processing result, the display image S that is projected by the image display unit 305. Although the details will be described later, the image generation unit 304 detects, based on the object distance, a concavity and convexity of the plane of projection P and generates an image corrected based on the concavity and convexity as the display image S.

The image display unit 305 is a unit (projector) that can project an image, and projects the display image S that is generated by the image generation unit 304 on the plane of projection P. The image display unit 305 may be a projector that uses an arbitrary system. It is desirable that the image display unit 305 is disposed close to the imaging unit 301.

The input processing unit 306 determines a user's operation input based on the object distance supplied from the distance detection unit 303, and performs input processing for the operation input. Although the details will be described later, the input processing unit 306 detects a contact of the user's hand H2 on the plane of projection p, and determines the user's operation input based on the positional relationship between the contact position and the imaging unit 301. The input processing generated by the input processing unit 306 is supplied to an operating system of the information processing apparatus 300.

The information processing apparatus 300 has the configuration described above. The image obtaining unit 302, the distance detection unit 303, the image generation unit 304, and the input processing unit 306 can be functional parts implemented by the cooperation between software and hardware, are not limited to be housed physically in the casing of the information processing apparatus 300, and may also be mounted on a network.

[Operation of Information Processing Apparatus]

Figure 17:
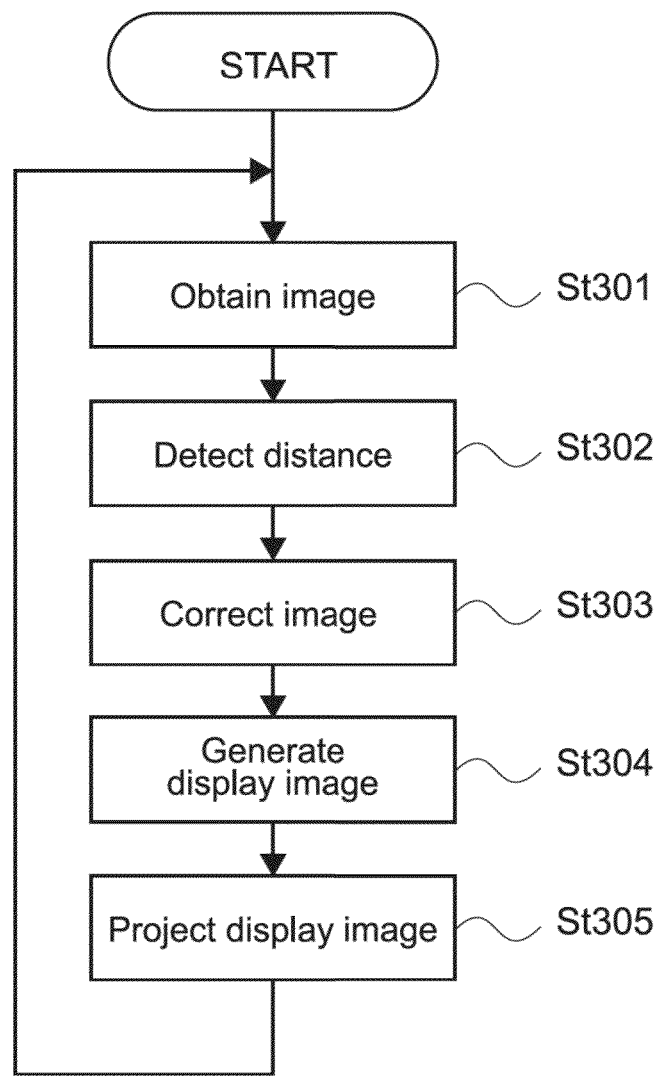
FIG. 17 is a flowchart showing an operation of the information processing apparatus.

FIG. 17 is a flowchart showing an operation of the information processing apparatus 300.

As shown in FIG. 17, the image obtaining unit 302 obtains an image (St301). The image obtaining unit 302 can obtain an image in the same manner as the first embodiment. Specifically, the image obtaining unit 302 obtains a plurality of images taken at a predetermined interval in a range that includes at least the user's hand H1 while moving a focus distance of the imaging unit 301. Moreover, the image obtaining unit 302 stores data on an in-focus area, which is used for the detection of the object (hand H1).

Figure 18:
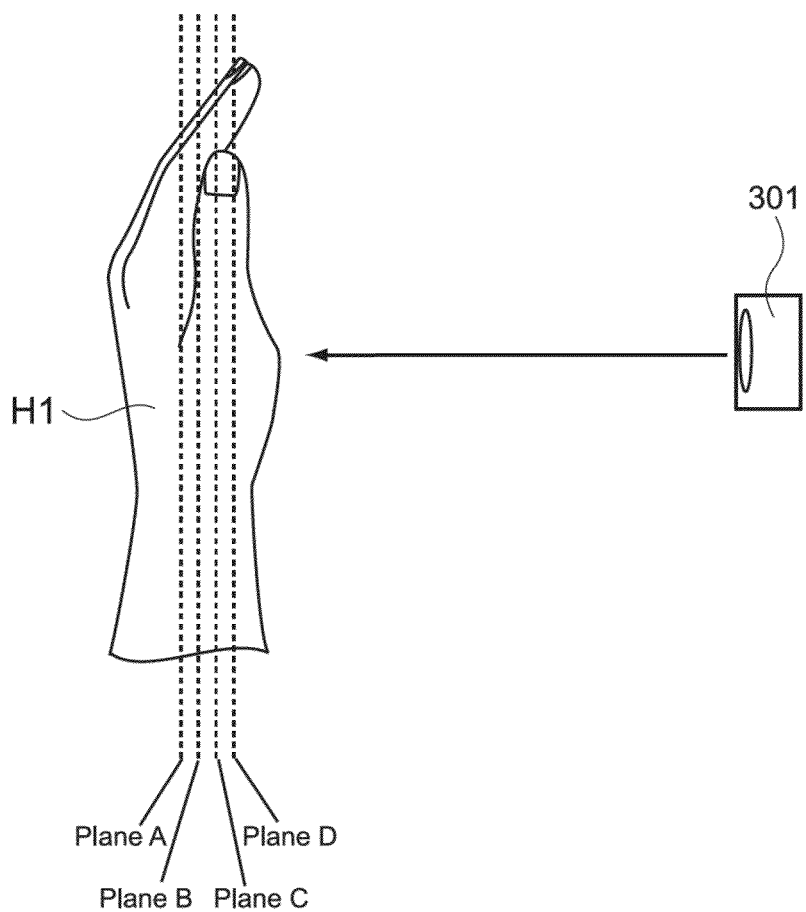
FIG. 18 is a schematic diagram showing planes including a focus distance in an image taken by an imaging unit in the information processing apparatus.
Figure 19A:
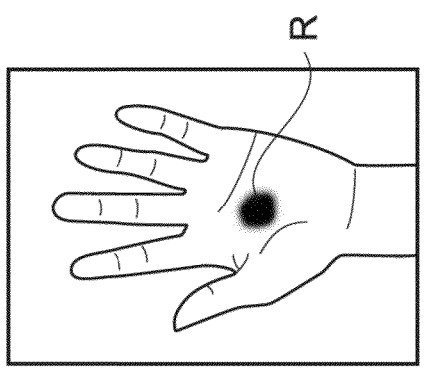
FIGS. 19A to 19D are each a schematic diagram showing an in-focus area in each image taken by the imaging unit in the information processing apparatus.
Figure 19B:
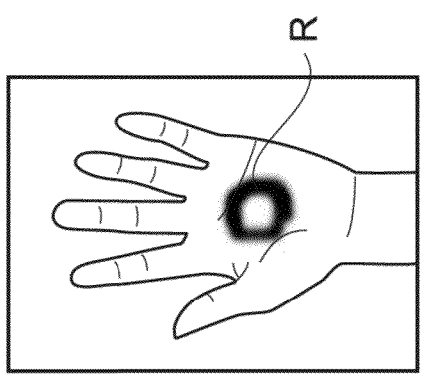
Figure 19C:
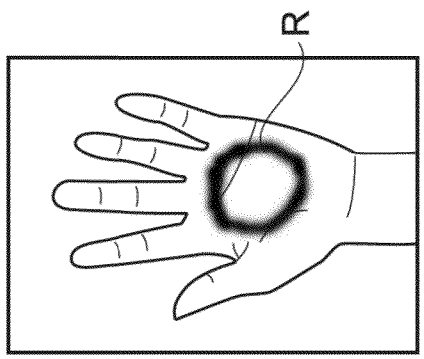
Figure 19D:
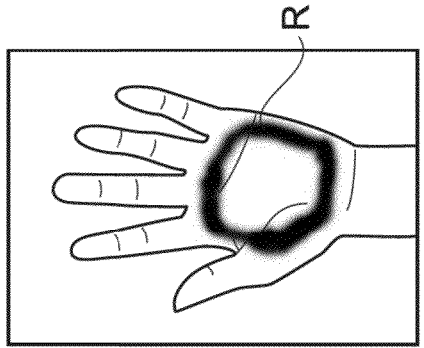

FIG. 18 is a schematic diagram showing planes including a focus distance at which an image is taken. The image is taken on a plane A, plane B, plane C, and plane D of the hand H1 shown in FIG. 18. FIGS. 19A to 19D are each a schematic diagram showing an in-focus area in each image. FIG. 19A shows an in-focus area R in an image taken on the plane A shown in FIG. 18. Similarly, FIGS. 19B, 19C, and 19D show the in-focus area R in an image taken on the planes B, C, and D shown in FIG. 18, respectively. As shown in FIG. 19, a distribution of an in-focus area in each image is different because a distance between the hand H1 and the imaging unit 301 is different depending on the concavity and convexity of the hand H1 (plane of projection P).

Next, the distance detection unit 303 detects the distance between the imaging unit 301 and the object (hand H1) within the imaging range of the imaging unit 301 (St302). Specifically, the distance detection unit 303 can detect the concavity and convexity of the plane of projection P (distance between the imaging unit 301 and respective parts of the hand H1) by specifying the position of the hand H1 for each image based on the distribution of the in-focus area R in each image. The distance detection unit 303 supplies the object distance to the image generation unit 304.

Figure 20A:
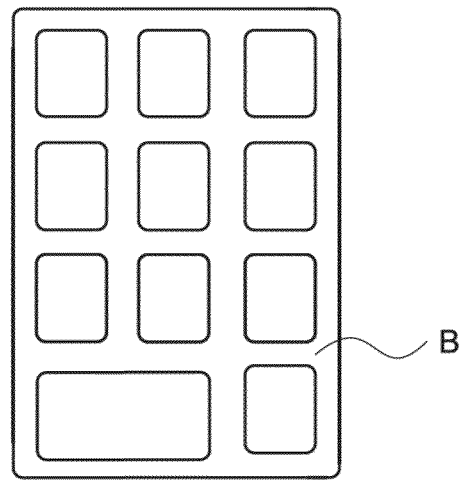
FIGS. 20A and 20B are each a schematic diagram showing how to correct a display object image by an image generation unit in the information processing apparatus.
Figure 20B:
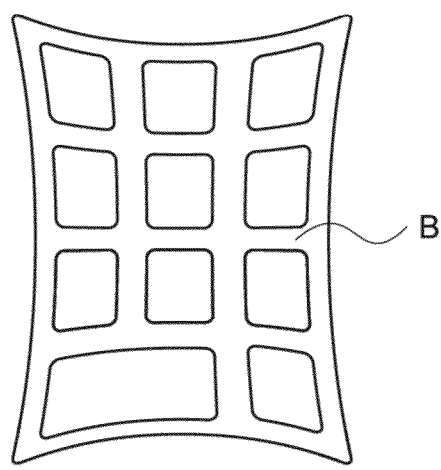

Next the image generation unit 304 corrects the image (hereinafter referred to as display object image) G of an object to be displayed by using the object distance (St303). FIGS. 20A and 20B are each a schematic diagram showing an example of how to correct the display object image G. As shown in FIG. 20B, the image generation unit 304 corrects the display object image G shown in FIG. 20A in accordance with the concavity and convexity of the plane of projection P, which is detected by the distance detection unit 303. The image generation unit 304 can correct the display object image G so as to compress an area of the display object image G projected on an area (convex area) on the plane of projection P, which is close to the imaging unit 301, and extend an area of the display object image G projected on an area (concave area) on the plane of projection P, which is distant from the imaging unit 301.

Figure 21:
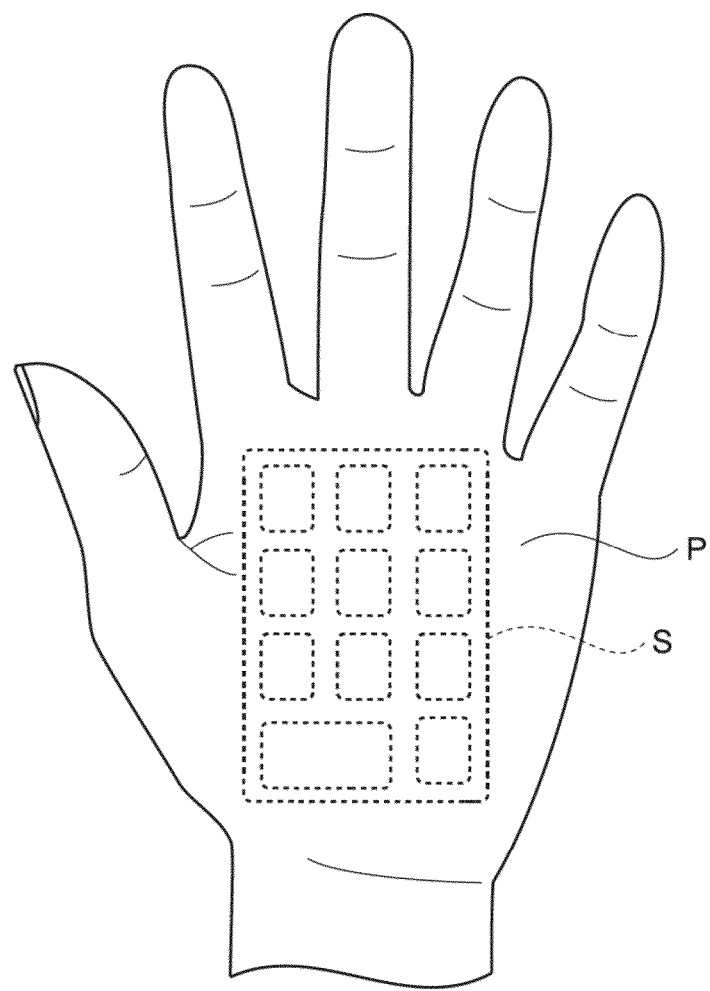
FIG. 21 is a schematic diagram showing a display image projected on a plane of projection by an image display unit in the information processing apparatus.

The image generation unit 304 generates the display image S by using the display object image G corrected as describe above (St304). The image generation unit 304 outputs the generated display image S to the image display unit 305, and causes the image display unit 305 to project the display image S on the plane of projection P (St305). FIG. 21 is a schematic diagram showing the display image S projected on the plane of projection P. As shown in the figure, since the display image S is corrected depending on the concavity and convexity of the plane of projection P, it causes no distortion of an image due to the concavity and convexity of the plane of projection P.

It should be noted that the input processing unit 306 performs input processing for the user's operation input along with the generation and projection of the display image S. The input processing unit 306 can determine whether or not the hand H2 is in contact with the plane of projection P based on the distance (object distance) between respective parts of the hand H2 and the imaging unit 301, which is supplied from the distance detection unit 303. The input processing unit 206 can determine the user's operation input based on, for example, the positional relationship between the imaging unit 301 and the place at which the hand H2 is in contact with the plane of projection P.

Figure 22:
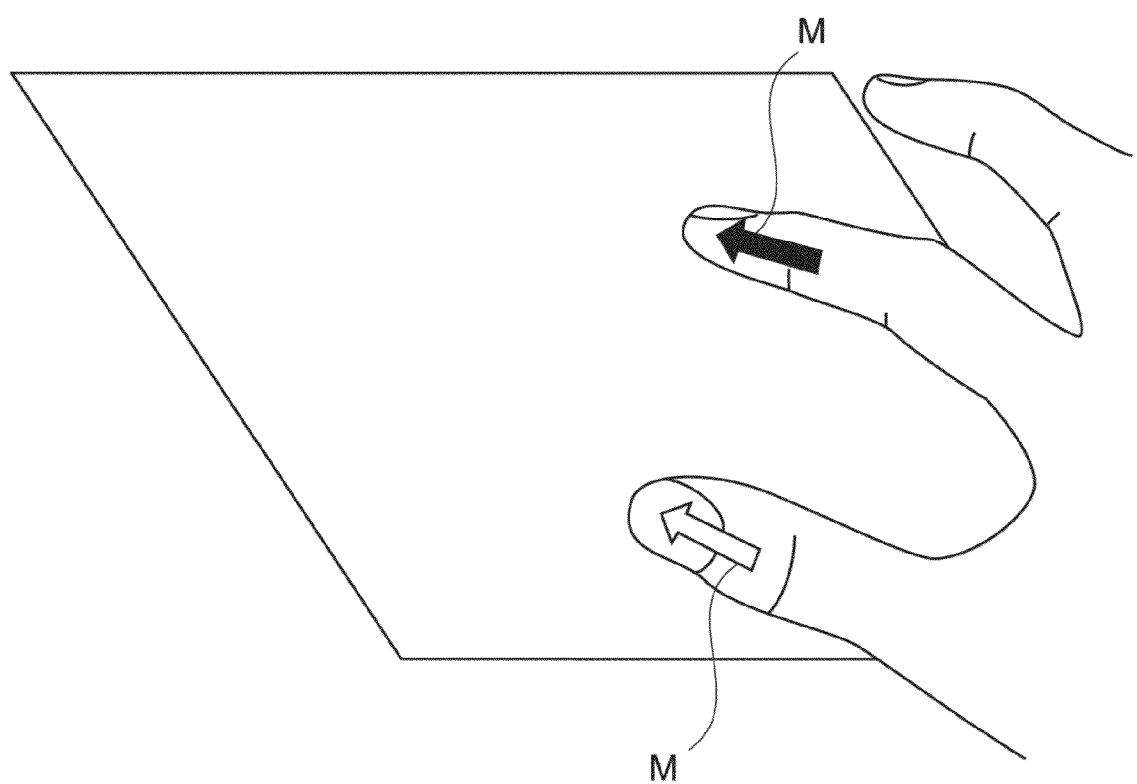
FIG. 22 is a schematic diagram showing markers projected on a user's hand by the image display unit in the information processing apparatus.

In this embodiment, the detected object distance is used for generating the display object image G, but is not limited to this. For example, it is possible to display a marker on the user's hand H1 by using the object distance. FIG. 22 is a schematic diagram showing markers M projected on the user's hand H1. With these markers, the user can easily confirm the position of the finger. Moreover, it is possible to display the markers M with increasing the size or strength of the markers M as the hand H approaches an operation object (e.g., keyboard)

As described above, in this embodiment, it is possible to detect a distance between the imaging unit 301 and the object (hand H1) within the imaging range based on a plurality of images taken at a different focus distance. Further, it is possible to correct the display object image by using the distance. Accordingly, it causes no distortion of an image due to the concavity and convexity of the surface of the object (plane of projection P). Thus, it is possible to improve the user's visibility.

Embodiments of the present disclosure are not limited to the above-mentioned embodiments and various modifications can be made without departing from the gist of the present disclosure.

In the above-mentioned embodiments, the object to be displayed is a keyboard, but is not limited to this. For example, the object to be displayed may be another input apparatus such as a mouse. In this case, the pointing range may be clearly shown with a circle or a square. Moreover, in the above-mentioned embodiments, the object within the imaging range of the imaging unit is a user's hand, but not limited to this. For example, the object may be a stylus. Moreover, there is no need to update distance data at a first rate when a change in a distance from the imaging unit is small, e.g., when a distance to a palm is recognized.

It should be noted that the present disclosure may also take the following configurations.

(1) An information processing apparatus, including:
an image obtaining unit configured to obtain a plurality of images taken at a focus distance that is different for each imaging unit;
a distance detection unit configured to detect, based on the plurality of images, a distance between an object and the imaging unit, the object being within an imaging range of the imaging unit; and
an image generation unit configured to generate, based on the distance, a display image that is displayed by an image display unit.

(2) The information processing apparatus according to (1), in which
the image obtaining unit is configured to extract an in-focus area for each of the plurality of images, the in-focus area being an area in focus, and
the distance detection unit is configured to detect the distance based on a distribution of the in-focus area.

(3) The information processing apparatus according to (1) or (2), in which
the image generation unit is configured to modify, based on the distance, a display object image to generate the display image, the display object image being an image of an object to be displayed.

(4) The information processing apparatus according to any one of (1) to (3), in which
the image generation unit is configured to create, based on the distance, an image mask and combine the image mask with the display object image to generate the display image.

(5) The information processing apparatus according to any one of (1) to (4), in which
the image generation unit is configured to extract, based on the distance, an image of the object and combine the image of the object with the display object image to generate the display image.

(6) The information processing apparatus according to any one of (1) to (5), in which
the image generation unit is configured to detect, based on the distance, a concavity and convexity of the object and correct the display object image based on the concavity and convexity to generate the display image.

(7) The information processing apparatus according to any one of (1) to (6), in which
the display object image is an image of an input apparatus.

(8) The information processing apparatus according to any one of (1) to (7), in which
the image obtaining unit is configured to control, based on the distance, a focus distance range in which the imaging unit takes an image.

(9) The information processing apparatus according to any one of (1) to (8), further including
an input processing unit configured to process, based on the distance, an operation input of a user.

(10) An information processing apparatus, including:
an imaging unit configured to take a plurality of images at a different focus distance;
an image obtaining unit configured to obtain the plurality of images;
a distance detection unit configured to detect, based on the plurality of images, a distance between an object and the imaging unit, the object being within an imaging range of the imaging unit;
an image generation unit configured to generate, based on the distance, a display image; and
an image display unit configured to display the display image.

(11) The information processing apparatus according to (10), in which
the image display unit is configured to project the display image on a plane of projection.

(12) The information processing apparatus according to (10) or (11), in which
the image display unit is configured to display the display image on a display screen.

(13) A program that causes an information processing apparatus to function as:
an image obtaining unit configured to obtain a plurality of images taken at a focus distance that is different for each imaging unit;
a distance detection unit configured to detect, based on the plurality of images, a distance between an object and the imaging unit, the object being within an imaging range of the imaging unit; and
an image generation unit configured to generate, based on the distance, a display image that is displayed by an image display unit.

(14) An information processing method, including:

obtaining, by an image obtaining unit, a plurality of images taken at a focus distance that is different for each imaging unit;

detecting, by a distance detection unit, a distance between an object and the imaging unit based on the plurality of images, the object being within an imaging range of the imaging unit; and generating, by an image generation unit, a display image based on the distance, the display image being displayed by an image display unit.

It should be noted that the present disclosure may also take the following configurations.

(1) An information processing apparatus including an imaging unit; and an image generation unit to generate a display image based on a distance between the imaging unit and an object, wherein the distance is detected by using a plurality of images obtained by the imaging unit at respective focus distances.

(2) The information processing apparatus according to (1), wherein the distance is determined by detecting at least one in-focus area for the plurality of images.

(3) The information processing apparatus according to (1), further including a display unit to display the display image.

(4) The information processing apparatus according to (3), wherein the image generation unit extracts an object image from an image obtained by the imaging unit, and generates the display image by combining the object image with a display object image.

(5) The information processing apparatus according to (4), wherein the image generation unit modifies the extracted object image by at least one of extending at least a portion of the extracted object image and compressing at least a portion of the extracted object image.

(6) The information processing apparatus according to (3), wherein the image generation unit extracts an object image from an image obtained by the imaging unit, modifies the extracted object image to generate a modified object image, and generates the display image by combining the modified object image with a display object image.

(7) The information processing apparatus according to (1), further including an image display unit to project the display image onto a plane of projection that is located on the object.

(8) The information processing apparatus according to (7), wherein the image generation unit detects, based on the distance, a concavity and a convexity of the plane of projection, and generates the display image based on the concavity and the convexity.

(9) The information processing apparatus according to (1), wherein generating the display image includes modifying a display object image based on the distance.

(10) The information processing apparatus according to (1), wherein the image generation unit generates an image mask, and the image generation unit generates the display image by combining the image mask with a display object image.

(11) The information processing apparatus according to (10), wherein the image generation unit optimizes the image mask by magnifying the image mask at a predetermined proportion.

(12) The information processing apparatus according to (10), wherein the image generation unit optimizes the image mask by contracting the image mask at a predetermined proportion.

(13) The information processing apparatus according to (10), wherein the image generation unit blurs the boundaries of the image mask.

(14) The information processing apparatus according to (10), wherein the object is a hand.

(15) The information processing apparatus according to (10), wherein the display object image is an image of an input apparatus.

(16) The information processing apparatus according to (1), wherein the display image is projected onto a plane of projection, a contact position of the object on the plane of projection is determined, and a user's operation input is determined based on a positional relationship between the contact position and the display image.

(17) The information processing apparatus according to (16), wherein the object is a hand.

(18) The information processing apparatus according to (1), wherein the object is a hand and the display image includes one or more markers for display on the hand.

(19) An information processing method including detecting a distance between an imaging unit and an object by using a plurality of images obtained by the imaging unit at respective focus distances; and generating a display image based on the distance.

(20) A non-transitory computer-readable medium storing a computer-readable program for implementing a method including detecting a distance between an imaging unit and an object by using a plurality of images obtained by the imaging unit at respective focus distances; and generating a display image based on the distance.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
an imaging unit; and
an image generation unit to generate a display image based on a distance between the imaging unit and an object,
wherein the distance is detected by using a plurality of images obtained by the imaging unit at respective focus distances, and
in which the plurality of images includes at least a first image and a second image, said first image being obtained prior to obtaining the second image, and said first image obtained at a first fixed focus distance and said second image obtained at a second fixed focus distance which is less than the first fixed focus distance.

2. The information processing apparatus as recited in claim 1, wherein the distance is determined by detecting at least one in-focus area for the plurality of images.

3. The information processing apparatus as recited in claim 1, further comprising a display unit to display the display image.

4. The information processing apparatus as recited in claim 3, wherein the image generation unit extracts a physical object image from an image obtained by the imaging unit, and generates the display image by combining the physical object image with an interface display object image.

5. The information processing apparatus as recited in claim 4, wherein the image generation unit modifies the extracted object image by at least one of extending at least a portion of the extracted object image and compressing at least a portion of the extracted object image.

6. The information processing apparatus as recited in claim 3, wherein the image generation unit extracts a physical object image from an image obtained by the imaging unit, modifies the extracted physical object image to generate a modified physical object image, and generates the display image by combining the modified physical object image with an interface display object image.

7. The information processing apparatus as recited in claim 1, further comprising an image display unit to project the display image onto a plane of projection that is located on the object.

8. The information processing apparatus as recited in claim 7, wherein the image generation unit detects, based on the distance, a concavity and a convexity of the plane of projection, and generates the display image based on the concavity and the convexity.

9. The information processing apparatus as recited in claim 1, wherein generating the display image comprises modifying a display object image based on the distance.

10. The information processing apparatus as recited in claim 1, wherein the image generation unit generates an image mask, and the image generation unit generates the display image by combining the image mask with an interface display object image.

11. The information processing apparatus as recited in claim 10, wherein the image generation unit optimizes the image mask by magnifying the image mask at a predetermined proportion.

12. The information processing apparatus as recited in claim 10, wherein the image generation unit optimizes the image mask by contracting the image mask at a predetermined proportion.

13. The information processing apparatus as recited in claim 10, wherein the image generation unit blurs the boundaries of the image mask.

14. The information processing apparatus as recited in claim 10, wherein the object is a hand.

15. The information processing apparatus as recited in claim 10, wherein the interface display object image is an image of an input apparatus.

16. The information processing apparatus as recited in claim 1, wherein the display image is projected onto a plane of projection, a contact position of the object on the plane of projection is determined, and a user's operation input is determined based on a positional relationship between the contact position and the display image.

17. The information processing apparatus as recited in claim 16, wherein the object is a hand.

18. The information processing apparatus as recited in claim 1, wherein the object is a hand and the display image comprises one or more markers for display on the hand.

19. An information processing method comprising:
    detecting a distance between an imaging unit and an object by using a plurality of images obtained by the imaging unit at respective focus distances; and
    generating a display image based on the distance,
    in which the plurality of images includes at least a first image and a second image, said first image being obtained prior to obtaining the second image, and said first image obtained at a first fixed focus distance and said second image obtained at a second fixed focus distance which is less than the first fixed focus distance.

20. A non-transitory computer-readable medium storing a computer-readable program for implementing a method comprising:
    detecting a distance between an imaging unit and an object by using a plurality of images obtained by the imaging unit at respective focus distances; and
    generating a display image based on the distance,
    in which the plurality of images includes at least a first image and a second image, said first image being obtained prior to obtaining the second image, and said first image obtained at a first fixed focus distance and said second image obtained at a second fixed focus distance which is less than the first fixed focus distance.

* * * * *